United States Patent
Jha et al.

(10) Patent No.: US 11,736,955 B2
(45) Date of Patent: *Aug. 22, 2023

(54) SYSTEMS AND METHODS FOR IDENTIFYING A SERVICE QUALIFICATION OF A UNIT IN A MULTI-UNIT BUILDING

(71) Applicant: Verizon Patent and Licensing Inc., Basking Ridge, NJ (US)

(72) Inventors: Vipul Jha, Plano, TX (US); Rajat Sharma, Southlake, TX (US); Sheikbharith Liakathali, Irving, TX (US); Thomas D. Wise, Chalfont, PA (US); Senthilkumaran Kulandaivelan, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,498

(22) Filed: Mar. 4, 2022

(65) Prior Publication Data

US 2022/0191708 A1 Jun. 16, 2022

Related U.S. Application Data

(63) Continuation of application No. 16/872,498, filed on May 12, 2020, now Pat. No. 11,284,274.

(51) Int. Cl.
*H04L 12/26* (2006.01)
*H04W 16/22* (2009.01)
(Continued)

(52) U.S. Cl.
CPC .... *H04W 16/225* (2013.01); *G06F 16/24553* (2019.01); *G06F 3/04842* (2013.01)

(58) Field of Classification Search
CPC . H04W 16/225; H04W 4/33; G06F 16/24553; G06F 3/04842; G06F 3/0481;
(Continued)

(56) References Cited

U.S. PATENT DOCUMENTS

| | | |
|---|---|---|
| 5,422,989 A | 6/1995 | Bell et al. |
| 6,074,693 A | 6/2000 | Manning |

(Continued)

FOREIGN PATENT DOCUMENTS

| | | |
|---|---|---|
| CN | 108521605 | 9/2018 |
| CN | 113343858 | 9/2021 |

*Primary Examiner* — Phuongchau Ba Nguyen

(57) ABSTRACT

A service qualification platform may receive, from a user device, a service request to qualify a unit of a multi-unit building to receive a service. The service qualification platform may obtain a service coverage mapping associated with the multi-unit building and may provide, to the user device and via a user interface that is associated with a geographic information system, a unit location request for an indication of a location of the unit within the multi-unit building. The service qualification platform may receive unit location information that is associated with the indication and may determine a service qualification metric based on the service coverage mapping and the unit location information, wherein the service qualification metric is associated with a capability of receiving the service within the unit. The service qualification platform may perform an action associated with the service qualification metric.

19 Claims, 10 Drawing Sheets

(51) Int. Cl.
*G06F 16/2455* (2019.01)
*G06F 3/04842* (2022.01)

(58) Field of Classification Search
CPC ....... G06F 3/0488; H04L 47/10; H04L 43/50; H04L 12/2697; H04L 43/0852; H04L 43/00
See application file for complete search history.

(56) References Cited

U.S. PATENT DOCUMENTS

| | | |
|---|---|---|
| 9,395,876 B2 | 7/2016 | Bliss et al. |
| 10,902,546 B2 | 1/2021 | Veernapu et al. |
| 11,321,940 B2 * | 5/2022 | Jha ............................ G06T 7/70 |
| 2005/0245268 A1 | 11/2005 | Green et al. |
| 2009/0110177 A1 | 4/2009 | Sivakumar |
| 2012/0066275 A1 | 3/2012 | Gerstner et al. |
| 2012/0089470 A1 * | 4/2012 | Barnes, Jr. ............ H04M 1/724 705/16 |
| 2012/0296934 A1 * | 11/2012 | Carpenter ......... G06F 16/24578 707/769 |
| 2012/0321008 A1 | 12/2012 | Krishnaswamy et al. |
| 2017/0040004 A1 | 2/2017 | He |
| 2019/0069153 A1 | 2/2019 | Gideon |
| 2022/0327642 A1 * | 10/2022 | Kabir ................. G06Q 30/0643 |

* cited by examiner

US 11,736,955 B2

SYSTEMS AND METHODS FOR IDENTIFYING A SERVICE QUALIFICATION OF A UNIT IN A MULTI-UNIT BUILDING

RELATED APPLICATION

This application is a continuation of U.S. patent application Ser. No. 16/872,498, entitled "SYSTEMS AND METHODS FOR IDENTIFYING A SERVICE QUALIFICATION OF A UNIT IN A MULTI-UNIT BUILDING," filed May 12, 2020 (now U.S. Pat. No. 11,284,274), which is incorporated herein by reference in its entirety.

BACKGROUND

A network service (e.g., Internet access) may be provided via a wireless network (e.g., a fifth generation (5G) wireless network) to a customer residing in a home, to multiple customers residing in units (e.g., apartments, condominiums, and/or the like) of a multi-unit building, and/or the like.

DETAILED DESCRIPTION OF PREFERRED EMBODIMENTS

Figure 1A:
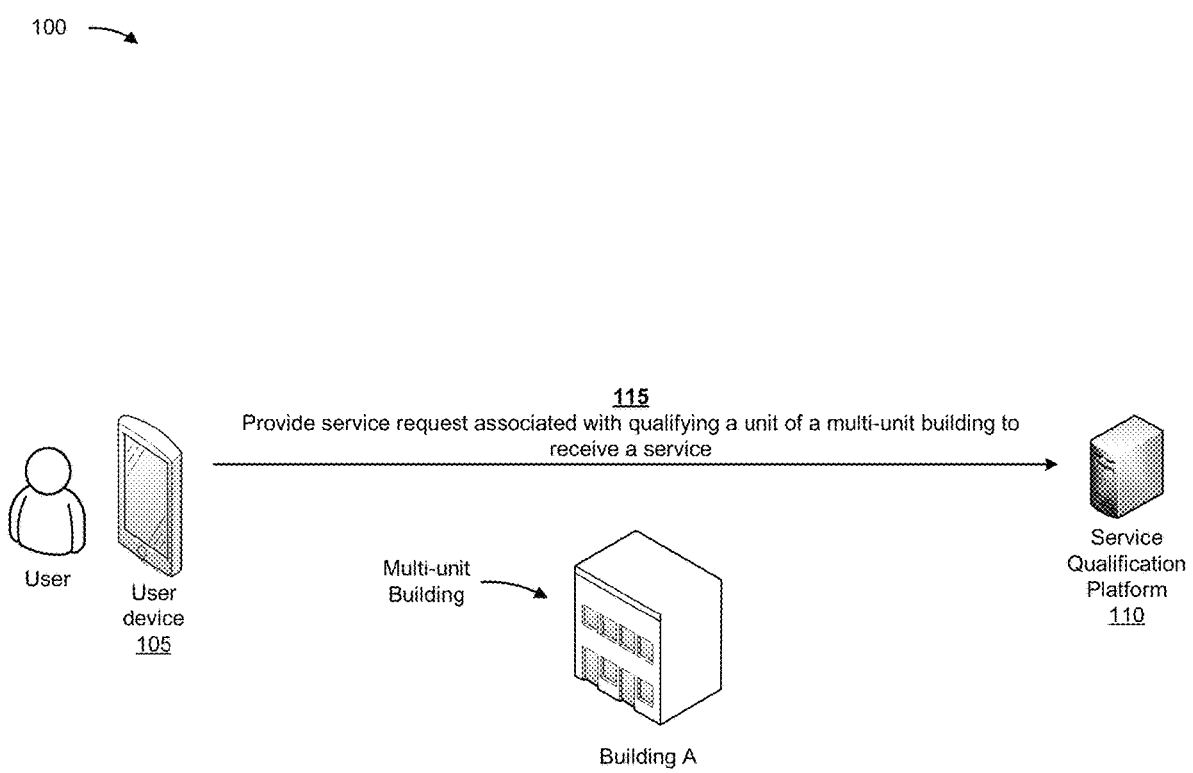
FIGS. 1A-1E are diagrams of one or more example implementations described herein.

The following detailed description of example implementations refers to the accompanying drawings. The same reference numbers in different drawings may identify the same or similar elements.

5G Ultra Wide Band service is a wireless network service that connects a customer's home with ultra-wide band Internet. Unlike signals used for 3G and 4G radio communication, 5G Ultra Wide Band signals are transmitted via a precise pattern that does not propagate throughout building structures. As a result, knowing where the signals interact with a multi-unit building and then precisely where any particular unit is within the multi-unit building is critical to understanding whether a customer can receive and use a 5G Ultra Wide Band service.

Currently, if a customer who lives in an apartment unit or a condominium unit desires such network service, the customer provides, to a network provider, a street address of the apartment complex or the condominium complex. The network provider qualifies the apartment unit or condominium unit for the network service based on a general availability of the network service at the street address. However, a specific apartment unit, condominium unit, a floor number, and/or the like may not be qualified for the network service because of geographical constraints such as having windows that face a side of the building without coverage, or the like. This causes false positives indicating network coverage for the network service where there is no coverage. Thus, current techniques waste computing resources (e.g., processing resources, memory resources, communication resources, and/or the like), networking resources, human resources, and/or the like by incorrectly qualifying wireless network coverage for a network service, correcting the wireless network coverage for the network service, handling customer complaints associated with the network service, and/or the like.

Some implementations described herein overcome a lack of a data source for location information concerning units within a multi-unit building. Further, some implementations are able to calculate an existence or strength of a signal (e.g., of a 5G signal) at a perimeter associated with a unit of the multi-unit building (e.g., at a building level, perimeter level, elevation level, and/or unit level).

Some implementations described herein provide a service qualification platform that qualifies a unit of a multi-unit building to receive a network service. In some implementations, the service qualification platform may receive, from a user device, a service request to qualify the unit of the multi-unit building to receive the network service. The service qualification platform may obtain a service coverage mapping associated with the multi-unit building and may provide, to the user device and via a user interface that is associated with a geographic information system, a unit location request for an indication of a location of the unit within the multi-unit building. The service qualification platform may receive unit location information that is associated with the indication and may determine a service qualification metric based on the service coverage mapping and the unit location information, wherein the service qualification metric is associated with a capability of receiving the network service within the unit. In some implementations, the service qualification platform may perform an action associated with the service qualification metric, such as provide, based on the service qualification metric, a notification to the user device that identifies whether the unit is capability of receiving the network service.

In this way, the service qualification platform identifies a service qualification of a unit in a multi-unit building. Thus, the service qualification platform reduces time required to qualify a network service for a unit of a multi-unit building, and conserves computing resources, networking resources, human resources, and/or the like that would otherwise be wasted incorrectly qualifying wireless network coverage for a network service, correcting the wireless network coverage for the network service, handling customer complaints associated with the network service, and/or the like.

FIGS. 1A-1E are diagrams of one or more example implementations 100 described herein. As shown in FIG. 1A, a user device 105 may be associated with a user (e.g., a technician) and a service qualification platform 110. In some implementations, user device 105 may include a mobile device, a computer, a telephone, and/or the like that the user may utilize to provide information to and/or receive information from service qualification platform 110. Service qualification platform 110 may include a platform that determines whether a service is available for a unit of a multi-unit building. The service may include, for example, establishing a local area network via an ultrawide band wireless network (e.g., for a user of the unit of the multi-unit building). Although implementations are described herein in connection with a multi-unit building, the implementations may also be utilized with a complex of multiple buildings.

As shown in FIG. 1A, and by reference number 115, user device 105 may provide a service request to service qualification platform 110. For example, the user of user device

105 may interact with an input interface of user device 105 to cause user device 105 to generate and send the service request to service qualification platform 110. The service request may be associated with qualifying a unit of a multi-unit building (shown in FIG. 1A as building A) to receive a service (e.g., establishment of a local area network, via an ultrawide band wireless network, for the unit).

The service request may include building location information of the multi-unit building. The building location information may include a street address of the multi-unit building, geographical coordinates of the multi-unit building, geographical coordinates of user device 105 (e.g., when the user and user device 105 are located at the unit and/or the multi-unit building), and/or the like. In some implementations, the service request may include a unit identifier associated with the unit of the multi-unit building (e.g., an apartment number associated with the unit, a suite number associated with the unit, and/or the like), floor information associated with the unit of the multi-unit building (e.g., information identifying a quantity of floors associated with the unit, information identifying which floor(s) of the multi-unit building are associated with the unit, and/or the like), and/or the like.

In some implementations, the service qualification platform 110 may send (e.g., in response to receiving the service request) a verification request to user device 105 to provide a verification that the unit has direct access (e.g., via a door, a window, and/or the like) to an exterior of the multi-unit building. User device 105 may provide, in response to the verification request, a verification response indicating whether the unit has direct access to an exterior of the multi-unit building. For example, user device 105 may cause the verification request to be displayed on a display screen of user device 105, and the user of user device 105 may interact with the input interface of user device 105 to cause user device 105 to generate and send the verification response to service qualification platform 110.

Figure 1B:
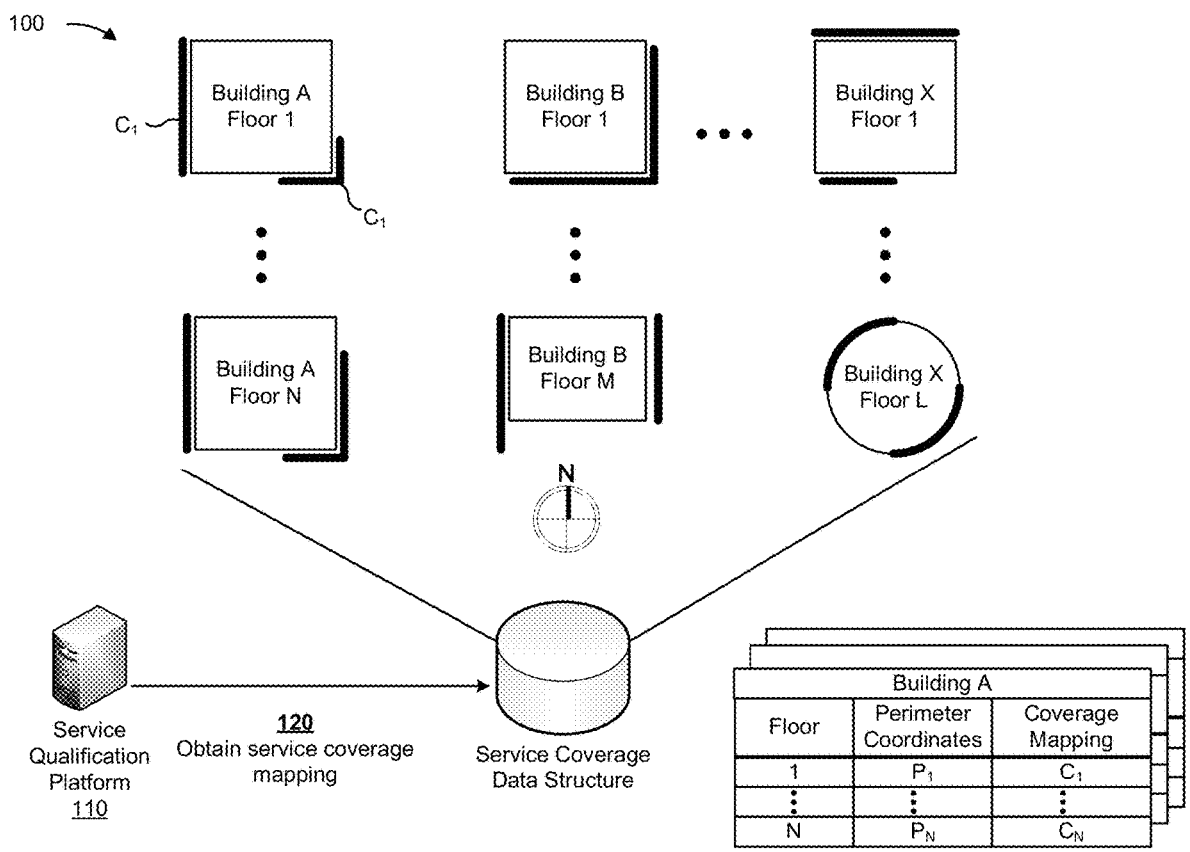
Figure 1C:
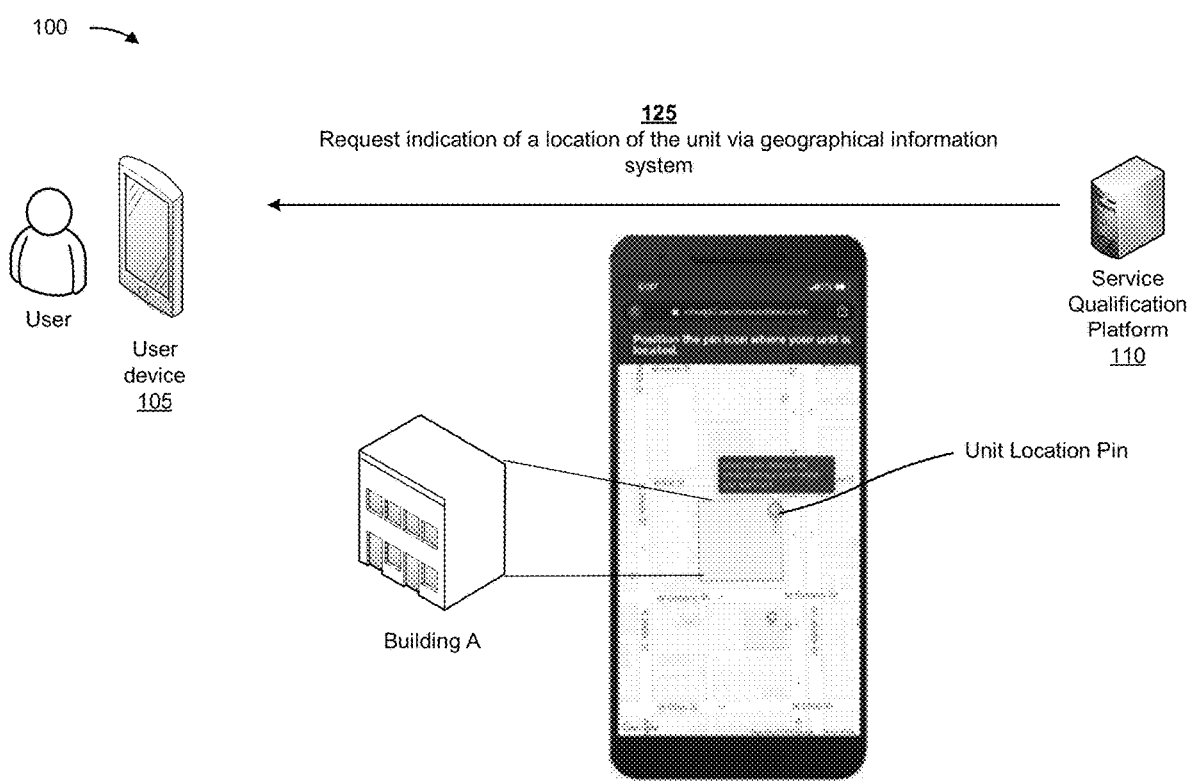
Figure 1D:
Figure 1E:
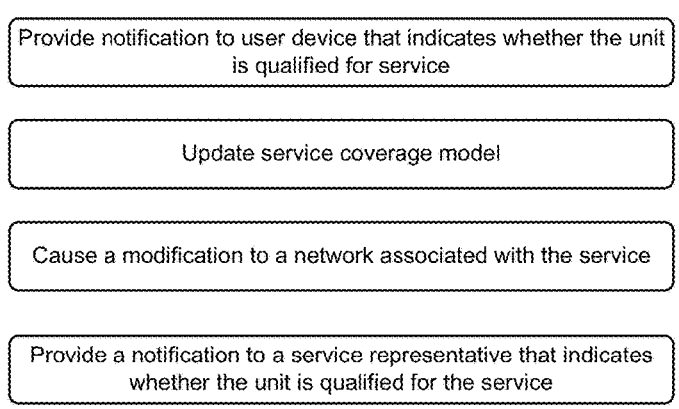
Figure 1E:

When the verification response indicates that the unit does not have direct access to an exterior of the multi-unit building, the service qualification platform 110 may determine that the unit is not capable of receiving the service and may perform one or more associated actions described herein in relation to FIG. 1E and reference number 140. When the verification response indicates that the unit has direct access to an exterior of the multi-unit building, the service qualification platform 110 may perform one or more of the processing steps described herein in relation to FIGS. 1B-1E.

As shown in FIG. 1B and by reference number 120, service qualification platform 110 may obtain a service coverage mapping associated with the multi-unit building (e.g., based on the building location information, the unit identifier, the floor information, and/or the like, included in the service request). Service qualification platform 110 may obtain the service coverage mapping from a service coverage data structure (e.g., a database, a table, a list, and/or the like) associated with service qualification platform 110 (e.g., that is included in the service qualification platform 110 and/or accessible to the service qualification platform 110).

The service coverage data structure may map a plurality of service coverage mappings to a plurality of sets of building location information for a plurality of multi-unit buildings. For example, as shown in FIG. 1B, a plurality of multi-unit buildings (shown as buildings A-X) may respectively comprise one or more floors (e.g., multi-unit building A comprises floors 1-N, multi-unit building B comprises floors 1-M, and multi-unit building X comprises floors 1-L).

Each floor of a multi-unit building may be associated with a coverage mapping that indicates an existence and/or strength of network coverage of a network (e.g., associated with the service) at one or more perimeter coordinates of the multi-unit building. For example, floor 1 of building A may be associated with a set of perimeter coordinates $P_1$ (e.g., geographical coordinates of an exterior of floor 1 of multi-unit building A) and a coverage mapping $C_1$. The coverage mapping C1 may indicate that, as depicted by bold lines in FIG. 1B, network coverage exists for a subset of perimeter coordinates, of the set of perimeter coordinates $P_1$, associated with a west side of multi-unit building A and a southeast side of multi-unit building A. Accordingly, as shown in FIG. 1B, the service coverage data structure may include an entry that indicates floor 1 of multi-unit building A is associated with coverage mapping C1 for perimeter coordinates P1 of multi-unit building A.

As further shown in FIG. 1B, each floor of a multi-unit building may be associated with a set of perimeter coordinates, a subset of perimeter coordinates (e.g., that is associated with an existence and/or a strength of network coverage), and/or a coverage mapping that is different than for another floor of the multi-unit building. For example, as shown in FIG. 1B, floor 1 of multi-unit building B is associated with a first set of perimeter coordinates (e.g., geographical coordinates of an exterior of floor 1 of multi-unit building B), a subset of perimeter coordinates of the first set of perimeter coordinates (e.g., associated with a south side and an east side of floor 1 of multi-unit building B), and a first coverage mapping that is different than an $M^{th}$ set of perimeter coordinates, a subset of perimeter coordinates of the $M^{th}$ set of perimeter coordinates (e.g., associated with a west side and an east side of floor M of multi-unit building B), and an $M^{th}$ coverage mapping associated with floor M of multi-unit building B. Accordingly, the service coverage data structure may include a mapping to a different set of perimeter coordinates and a different coverage mapping for each floor of a multi-unit building.

In some implementations, to obtain the service coverage mapping from the service coverage data structure, service qualification platform 110 may perform, based on the building location information, the unit identifier, the floor information, and/or the like, included in the service request, a lookup operation of the service coverage data structure to identify and/or select the service coverage mapping.

As shown in FIG. 1C and by reference number 125, service qualification platform 110 may provide a unit location request to user device 105. The unit location request may be for an indication of a location of the unit within the multi-unit building. Service qualification platform 110 may provide the unit location request to user device 105 via a user interface that is associated with a geographic information system (e.g., a geographic information system that provides interactive virtual maps, interactive annotated satellite images, and/or the like). In some implementations, the user interface may be embedded within an application interface of an application (e.g., an application associated with the geographic information system for displaying and/or depicting interactive virtual maps, interactive annotated satellite images, and/or the like).

In some implementations, the unit location request may identify, via the user interface, the multi-unit building. For example, the service qualification platform 110 may obtain, using the geographical information system (e.g., based on the building location information, the unit identifier, the floor information, and/or the like, included in the service request), an image (e.g., a satellite image) of the multi-unit building, and may cause the image of the multi-unit building to be depicted via the user interface. As shown in FIG. 1C, a birds-eye view of building A is depicted via the user interface. Additionally, or alternatively, the unit location request may identify, via the user interface, a moveable indicator for indicating a location of the unit within the multi-unit building. For example, as shown in FIG. 1C, the service qualification platform 110 may cause to be displayed, via the user interface, a request to position a unit location pin in the image of multi-unit building A that indicates where a unit is located within building A.

In some implementations, the user of user device 105 may interact with the user interface to select where the unit is located in the image of the multi-unit building. For example, the user may select a pixel location of the image of the multi-unit building that is depicted by the graphical user interface (e.g., by placing a unit location pin, a marker, and/or the like at the pixel location of the image). Accordingly, user device 105 may generate unit location information that identifies the selected pixel location of the image of the multi-unit building that is associated with the unit.

As shown in FIG. 1D and by reference number 130, user device 105 may provide, to service qualification platform 110, the unit location information via the global information system (e.g., in response to service qualification platform 110 providing the unit location request to user device 105). In some implementations, service qualification platform 110 may determine geographical coordinates associated with the unit by converting, using the geographical information system, the selected pixel location to geographical coordinates.

As shown in FIG. 1E and by reference number 135, service qualification platform 110 may determine a service qualification metric (e.g., based on the building location information, the unit identifier, the floor information, and/or the like, included in the service request; the service coverage mapping, the unit location information, the geographical coordinates associated with the unit, and/or the like). The service qualification metric may indicate a capability of receiving the service within the unit. For example, the service qualification metric may indicate whether the unit is associated with one or more perimeter coordinates of the multi-unit building where network coverage exists and/or where the network coverage is sufficiently strong to allow the service to be provided to the unit.

In some implementations, service qualification platform 110 may identify, from the service coverage mapping, perimeter coordinates of the multi-unit building (e.g., sets of geographical coordinates of a perimeter of the multi-unit building that are associated with network coverage). Service qualification platform 110 may determine, based on the perimeter coordinates, the unit location information, the geographical coordinates associated with the unit, and/or the like, a perimeter location of the multi-unit building that is nearest to the unit, and may determine a service coverage metric at the perimeter location. The service coverage metric may indicate whether the unit is within a threshold distance of the perimeter location (e.g., to allow the network coverage to reach the unit). The service qualification platform 110 may determine the service qualification metric based on the service coverage metric. For example, the service qualification metric may indicate that the unit is capable of receiving the service when the service coverage metric indicates that the unit is within the threshold distance of the perimeter location. As another example, the service qualification metric may indicate that the unit is not capable of receiving the service when the service coverage metric indicates that the unit is not within the threshold distance of the perimeter location. Additional details regarding determining the service qualification metric are described herein in relation to FIGS. 2A-2B.

In some implementations, when the service coverage metric indicates that the unit is not capable of receiving the service, the service qualification platform 110 may determine, based on the perimeter coordinates, the unit location information, the geographical coordinates associated with the unit, and/or the like, an additional perimeter location of the multi-unit building that is next nearest (e.g., after the perimeter location) to the unit and may determine an additional service coverage metric at the additional perimeter location. The additional service coverage metric may indicate whether the unit is within the threshold distance of the additional perimeter location (e.g., to allow the network coverage to reach the unit). The service qualification platform 110 may determine an additional service qualification metric based on the additional service coverage metric. The service qualification platform 110 may continue to perform iterations of determining new perimeter locations, new service coverage metrics, and/or new service qualification metrics in this way until a service coverage metric indicating that the unit is capable of receiving the service is found, or until a threshold number of iterations have been attempted.

As further shown in FIG. 1E and by reference number 140, service qualification platform 110 may perform one or more actions based on the service qualification metric. In some implementations, the one or more actions may include providing, to user device 105, a notification indicating whether the unit is qualified for service. For example, service qualification platform 110 may qualify the unit for the service (e.g., by updating one or more records to indicate that the unit has been qualified) based on the service qualification metric indicating that the unit is capable of receiving the service (e.g., when the service qualification metric satisfies a threshold for providing the service). The service qualification platform 110 may therefore provide, to user device 105, a notification indicating that the unit is qualified for the service. As another example, service qualification platform 110 may determine that the service qualification metric indicates that the unit is not capable of receiving the service (e.g., when the service qualification metric does not satisfy the threshold for providing the service) and may provide a notification indicating that the unit is not qualified for the service.

In some implementations, the one or more actions may include updating a service coverage model. For example, service qualification platform 110 may update (or cause to be updated) a service coverage model associated with the service coverage mapping to include the unit identifier, the unit location information, the geographical coordinates associated with the unit, and/or the like. The service coverage model may be trained to identify unit locations within multi-unit buildings based on historical data associated with identifying other units within other multi-unit buildings. In some implementations, the service coverage model may be used to update one or more entries in the service coverage data structure.

In some implementations, the one or more actions may include causing a modification to a network associated with the service. For example, when the service qualification metric does not satisfy the threshold for providing the service, service qualification platform 110 may cause a modification to a network configured to provide the service (e.g., to cause network coverage to reach a perimeter location of the multi-unit building that is nearest to the unit).

In some implementations, the one or more actions may include providing a notification to a service representative that indicates whether the unit is qualified for the service. For example, service qualification platform 110 may provide, to a user device of the service representative, a notification indicating that the unit is qualified for the service, to allow the service representative to communicate with the user of user device 105 to sign up for the service. As another example, service qualification platform 110 may provide, to the user device of the service representative, a notification indicating that the unit is not qualified for the service, to allow the service representative to communicate with the user of user device 105 to sign up for a different service (e.g., establishment of a local area network via a wired network)

As indicated above, FIGS. 1A-1E are provided merely as one or more examples. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2A:
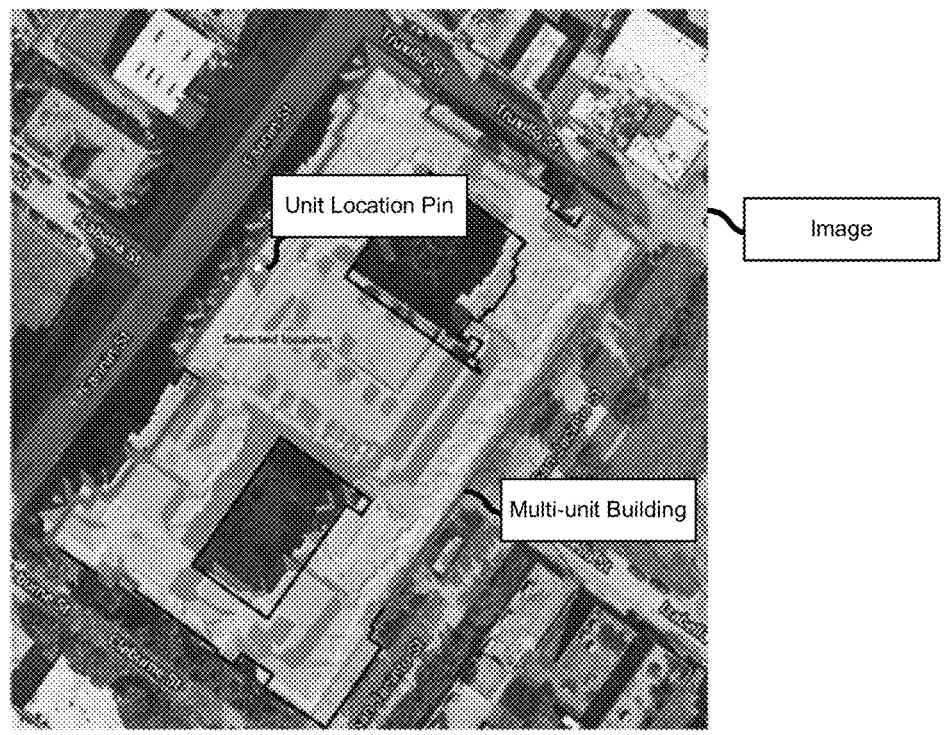
FIGS. 2A-2B are diagrams of one or more example implementations related to determining a service qualification metric described herein.
Figure 2B:
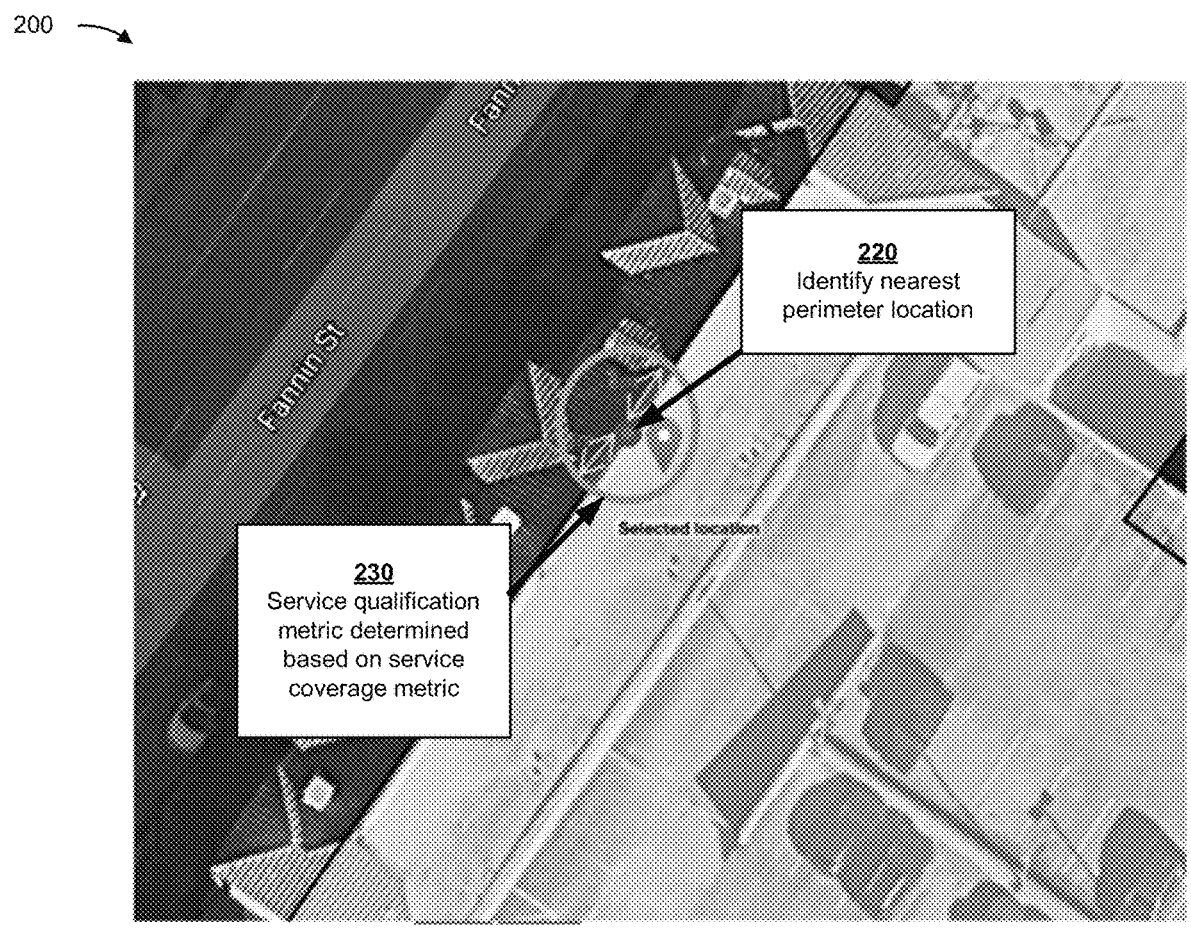

FIGS. 2A-2B are diagrams of one or more example implementations 200 related to determining a service qualification metric described herein. As shown in FIG. 2A and reference number 210, a user of user device 105 may interact with a user interface provided by a geographical information system to indicate a location of a unit within a multi-unit building by placing a unit location pin at a pixel location of an image of the multi-unit building. User device 105 may send unit location information identifying the indicated location of the unit to service qualification platform 110.

In some implementations, service qualification platform 110 may identify, based on a service coverage mapping associated with the unit and/or the multi-unit building, perimeter coordinates of the multi-unit building (e.g., that are associated with network coverage). As shown in FIG. 2B and by reference number 220, service qualification platform 110 may identify, based on the perimeter coordinates and the unit location information, a nearest perimeter location, to the unit, of the multi-unit building.

In some implementations, service qualification platform 110 may determine whether a location of the unit (e.g., indicated by the unit location information) is within a threshold distance of the perimeter location. For example, service qualification platform 110 may determine whether the location of the unit is within a three meter radius of the perimeter location. The service qualification platform 110 may generate a service coverage metric to indicate whether the location of the unit is within the threshold distance of the perimeter location. Additionally, or alternatively, service qualification platform 110 may generate the service coverage metric to indicate a distance between the location of the unit and the perimeter location.

As shown by reference number 230, service qualification platform 110 may determine a service qualification metric based on the service coverage metric. For example, the service coverage metric may indicate, when the service coverage metric indicates that the unit is within the threshold distance of the perimeter location, that the unit is capable of receiving the service. In some implementations, the service coverage metric may indicate a potential strength of network coverage of a network associated with the service (e.g., based on the distance between the location of the unit and the perimeter location). As another example, the service coverage metric may indicate that the unit is not capable of receiving the service when the service coverage metric indicates that the unit is not within the threshold distance of the perimeter location.

As indicated above, FIGS. 2A-2B are provided as an example. Other examples may differ from what is described with regard to FIGS. 2A-2B. The number and arrangement of devices shown in FIGS. 2A-2B are provided as an example. In practice, there may be additional devices, fewer devices, different devices, or differently arranged devices than those shown in FIGS. 2A-2B. Furthermore, two or more devices shown in FIGS. 2A-2B may be implemented within a single device, or a single device shown in FIGS. 2A-2B may be implemented as multiple, distributed devices. Additionally, or alternatively, a set of devices (e.g., one or more devices) shown in FIGS. 2A-2B may perform one or more functions described as being performed by another set of devices shown in FIGS. 2A-2B.

Figure 3:
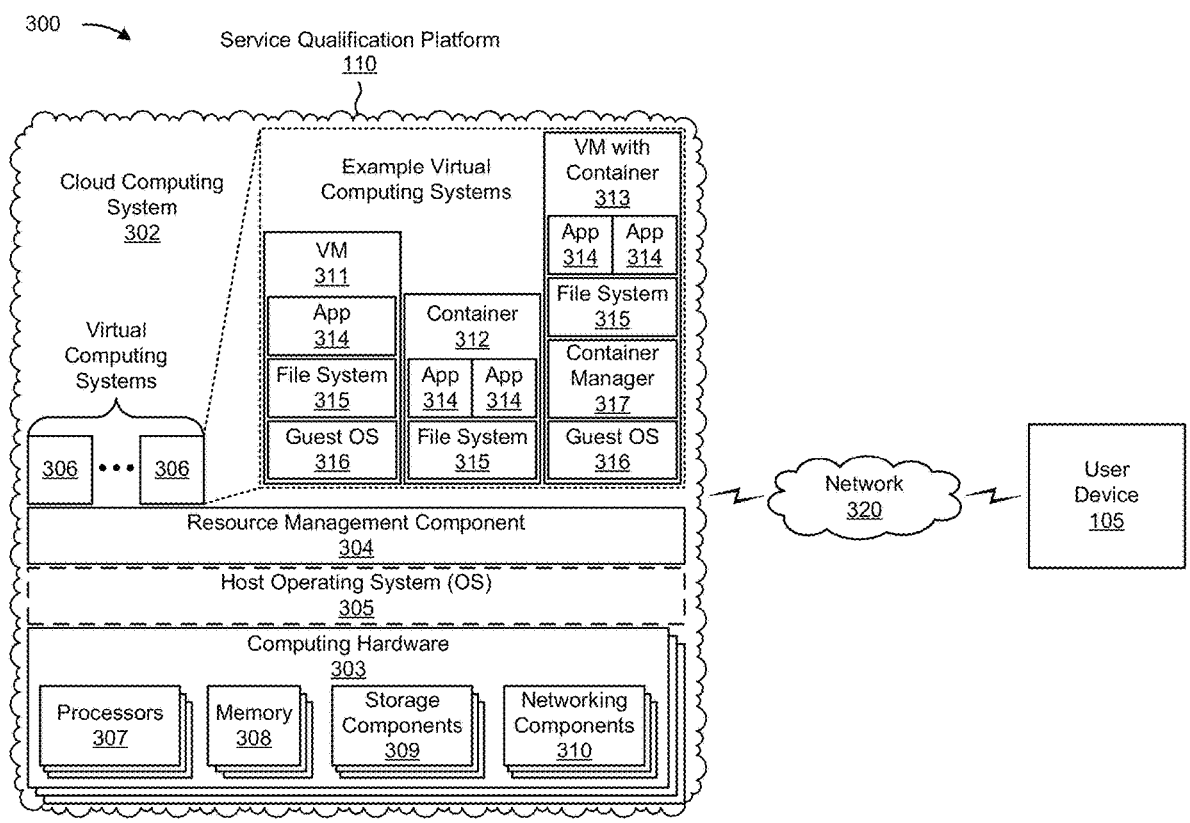
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include service qualification platform 110. The service qualification platform 110 may include one or more elements of a cloud computing system 302 and/or may execute within the cloud computing system 302 (e.g., as one or more virtual computing systems 306). The cloud computing system 302 may include one or more elements 303-317, as described in more detail below. As further shown in FIG. 3, environment 300 may include a network 320, and/or user device 105. Devices of environment 300 may interconnect via wired connections, wireless connections, or a combination of wired and wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using such virtualization, the resource management component 304 enables a single computing device (e.g., a computer, a server, a host device, and/or the like) to operate as if the single computing device were multiple computing devices, such as by creating multiple isolated virtual computing systems 306 from computing hardware 303 of the single computing device. The multiple virtual computing systems 306 operate independently from one another and do not interact with one another. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server or host device) or from multiple computing devices (e.g., multiple servers or host devices), such as multiple computing devices in one or more data centers, server farms, server pools, and/or the like. As shown, computing hardware 303 may include one or more processors 307, one or more memories 308, one or more storage components 309, and/or one or more networking components 310. Computing hardware 303 may be interconnected via one or more wired and/or wireless buses, which may interconnect computing hardware 303 within a single computing device and/or across multiple computing devices.

A processor 307 includes a central processing unit, a graphics processing unit, and/or the like. A memory 308 includes random-access memory, read-only memory, and/or the like. The memory 308 may store a set of instructions (e.g., one or more instructions) for execution by the processor 307. The processor 307 may execute the set of instructions to perform one or more operations or processes described herein. In some implementations, execution of the set of instructions, by one or more processors 307, causes the one or more processors 307 and/or the service qualification platform 110 to perform one or more operations or processes described herein. A storage component 309 includes a hard disk or another type of storage device that stores information, data, and/or software (e.g., code, instructions, and/or the like) related to the operation and use of the service qualification platform 110. In some implementations, memory 308 and/or storage component 309 is/are implemented as a non-transitory computer readable medium. A networking component 310 includes a network interface and corresponding hardware that enables the service qualification platform 110 to communicate with other devices of environment 300 via a wired connection and/or a wireless connection, such as via network 320. Additional examples of a processor, a memory, a storage component, and a networking component (e.g., a communication interface) are described elsewhere herein.

The resource management component 304 includes a virtualization application (e.g., executing on hardware, such as computing hardware 303) capable of virtualizing computing hardware 303 to start (e.g., create or spin up), stop (e.g., delete or tear down), and/or manage one or more virtual computing systems 306. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 304 may control access to and/or use of computing hardware 303 and/or software executing on computing hardware 303. Additionally, or alternatively, the resource management component 304 may perform binary rewriting to scan instructions received from a virtual computing system 306 and replace any privileged instructions with safe emulations of those instructions. The resource management component 304 may include a hypervisor or a virtual machine monitor, such as when the virtual computing systems 306 are virtual machines 311. Additionally, or alternatively, the resource management component 304 may include a container manager, such as when the virtual computing systems 306 are containers 312.

In some implementations, the resource management component 304 executes within and/or in coordination with a host operating system 305. For example, the resource management component 304 may execute on top of the host operating system 305 rather than interacting directly with computing hardware 303, such as when the resource management component 304 is a hosted hypervisor (e.g., a Type 2 hypervisor) or a container manager. In this case, the host operating system 305 may control access to and/or use of computing hardware 303 and/or software executing on computing hardware 303 based on information and/or instructions received from the resource management component 304. Alternatively, the resource management component 304 may interact directly with computing hardware 303 rather than interacting with the host operating system 305, such as when the resource management component 304 is a bare-metal hypervisor (e.g., a Type 1 hypervisor). Thus, in some implementations, the cloud computing system 302 does not include a host operating system 305. In some implementations, the host operating system 305 includes and/or executes an administrator application to enable a system administrator to manage, customize, and/or configure cloud computing system 302.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications 314 using a file system 315. The file system 315 may include binary files, software libraries, and/or other resources required to execute applications 314 on a guest operating system 316 or the host operating system 305. In some implementations, a virtual computing system 306 (e.g., a virtual machine 311 or a hybrid environment 313) includes a guest operating system 316. In some implementations, a virtual computing system 306 (e.g., a container 312 or a hybrid environment 313) includes a container manager 317.

A virtual machine 311 is an emulation of a computing device that enables execution of separate, isolated instances of virtual computing devices (e.g., multiple virtual machines 311) on the same computing hardware 303. The guest operating systems 316 and applications 314 of multiple virtual machines 311 may share computing hardware 303 from a single computing device or from multiple computing devices (e.g., a pool of computing devices). Each separate virtual machine 311 may include a guest operating system 316, a file system 315, and one or more applications 314. With a virtual machine 311, the underlying computing hardware 303 is virtualized, and the guest operating system 316 executes on top of this virtualized hardware. Using virtual machines 311 enables different types of guest operating systems 316 to execute on the same computing hardware 303 in an isolated environment, but with more resource usage and overhead than containers 312.

Unlike a virtual machine 311, a container 312 virtualizes a host operating system 305 rather than the underlying computing hardware 303. Thus, a container 312 does not require a guest operating system 316 because the application(s) 314 included in the container 312 execute directly on the host operating system 305 using a file system 315 included in the container 312. Each separate container 312 may share the kernel of the host operating system 305, and different applications 314 within a single container 312 may share a file system 315. This sharing of a file system 315 among multiple applications 314 reduces the need to reproduce operating system code for different applications, and enables a single host operating system 305 to execute multiple applications 314 and/or containers 312. As a result, containers 312 enable a greater quantity of applications 314 to execute on a smaller quantity of computing devices as compared to virtual machines 311.

A hybrid environment 313 includes elements of a virtual machine 311 and a container 312. For example, a hybrid environment 313 may include a guest operating system 316 that executes on top of virtualized hardware. A container manager 317 may execute on top of the guest operating system 316 to start, stop, and/or manage one or more containers within the hybrid environment 313. Using a hybrid environment 313 enables different types of guest operating systems 316 to execute on the same computing hardware 303 in an isolated environment, while also enabling lightweight containers to execute on top of the guest operating system 316.

The quantity of applications 314 shown in FIG. 3 as executing within each virtual computing system 306 is shown as an example, and a different quantity of applications 314 may execute within each virtual computing system. Furthermore, although the service qualification platform 110 may include one or more elements 303-317 of the cloud computing system 302, may execute within the cloud computing system 302, and/or may be hosted within the cloud computing system 302, in some implementations, the service qualification platform 110 may not be cloud-based (e.g., may be implemented outside of a cloud computing system) or may be partially cloud-based. For example, the service qualification platform 110 may include one or more devices that are not part of the cloud computing system 302, such as device 400 of FIG. 4, which may include a stand-alone server or another type of computing device. The service qualification platform 110 may perform one or more operations and/or processes described in more detail elsewhere herein.

Network 320 includes one or more wired and/or wireless networks. For example, network 320 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 320 enables communication among the devices of environment 300.

User device 105 includes one or more devices capable of receiving, generating, storing, processing, and/or providing information, such as information described herein. For example, user device 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like) or a similar type of device. User device 105 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
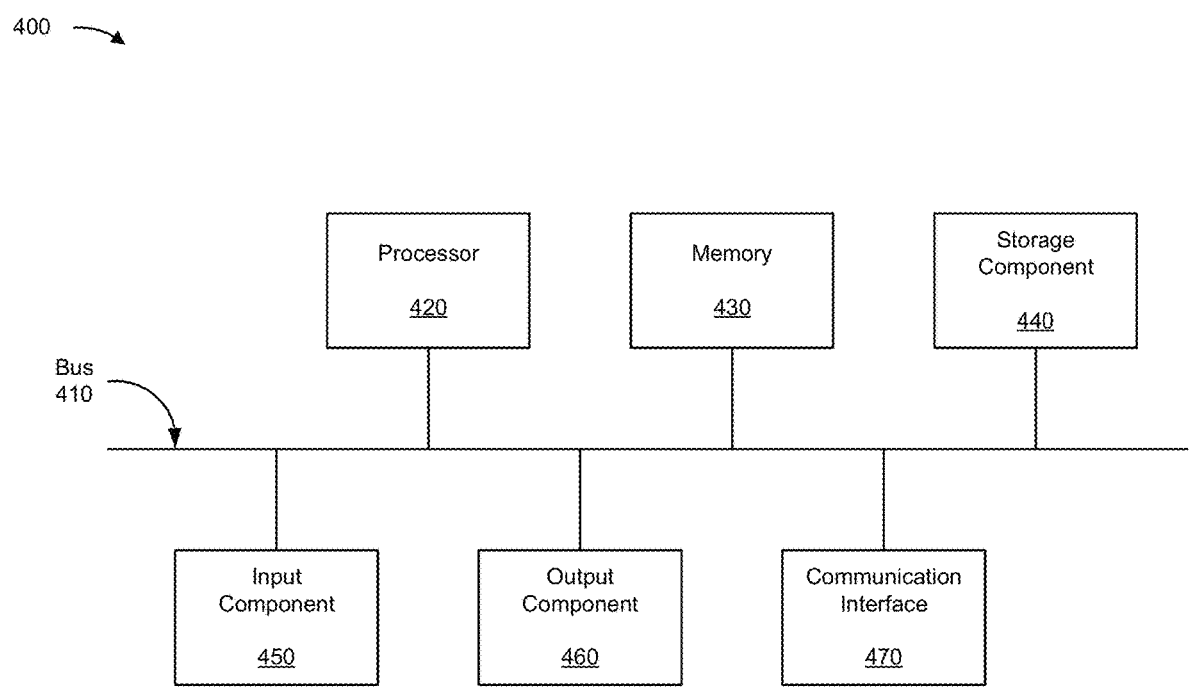
FIG. 4 is a diagram of example components of one or more devices of FIG. 3.

FIG. 4 is a diagram of example components of a device 400. Device 400 may correspond to user device 105, service qualification platform 110, and/or computing hardware 303. In some implementations, user device 105, service qualification platform 110, and/or computing hardware 303 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more LEDs).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, an RF interface, a universal serial bus (USB) interface, a wireless local area interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
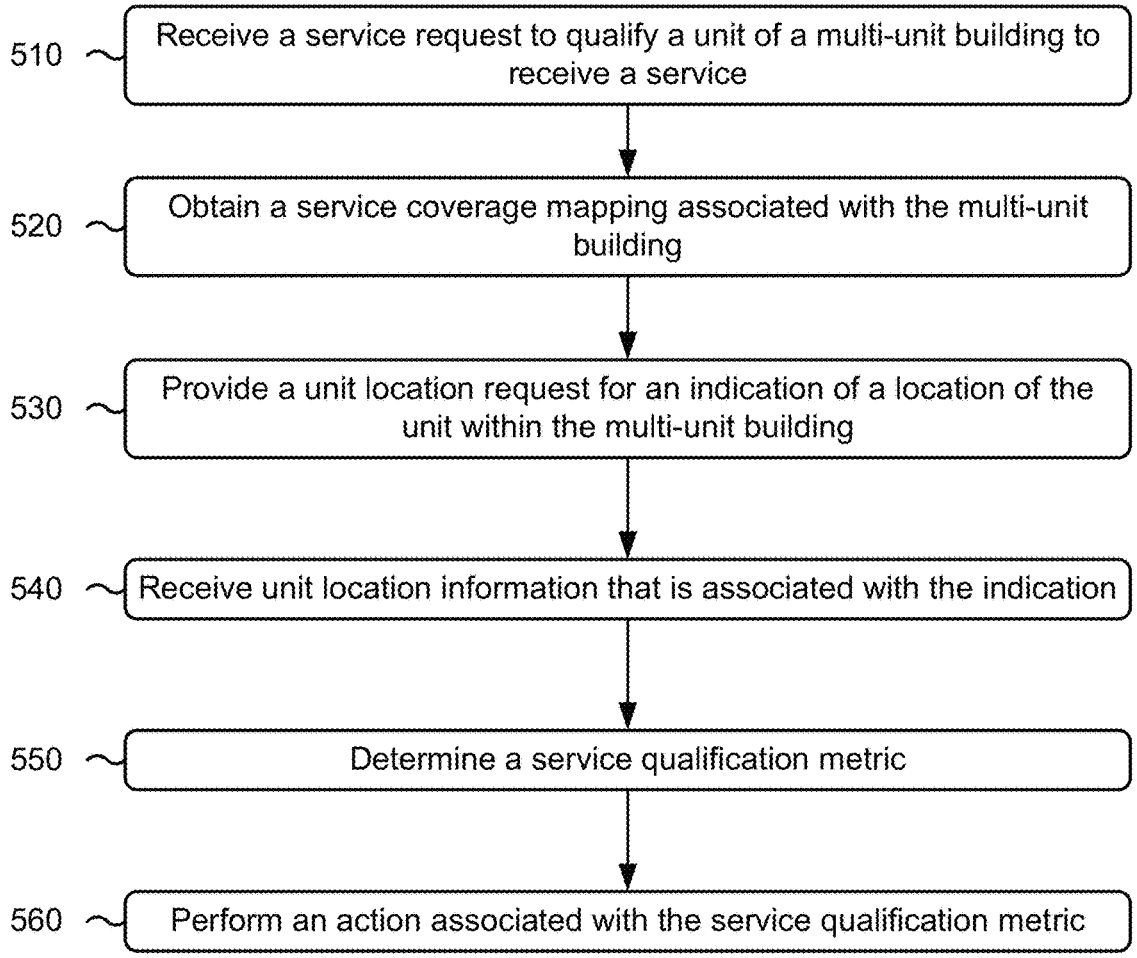
FIG. 5 is a flow chart of an example process relating to identifying a service qualification of a unit in a multi-unit building.

FIG. 5 is a flow chart of an example process 500 associated with identifying a service qualification of a unit in a multi-unit building. In some implementations, one or more process blocks of FIG. 5 may be performed by a device (e.g., service qualification platform 110). In some implementations, one or more process blocks of FIG. 5 may be performed by another device or a group of devices separate from or including the device, such as user device 105. Additionally, or alternatively, one or more process blocks of FIG. 5 may be performed by one or more components of computing hardware 303, such as processors 307, memory 308, storage component 309, networking components 310, and/or the like, and/or by one or more components of a device 400, such as processor 420, memory 430, storage component 440, input component 450, output component 460, communication interface 470, and/or the like.

As shown in FIG. 5, process 500 may include receiving a service request to qualify a unit of a multi-unit building to receive a service (block 510). For example, the device may receive (e.g., from a user device) a service request to qualify a unit of a multi-unit building to receive a service, as described above. In some implementations, the service request includes building location information of the multi-unit building and/or a unit identifier. The building location information may comprise a street address of the multi-unit building or geographical coordinates of the user device. The service may comprise establishing, for a user of the unit, a local area network via an ultrawide band wireless network.

As further shown in FIG. 5, process 500 may include obtaining a service coverage mapping associated with the multi-unit building (block 520). For example, the device may obtain a service coverage mapping associated with the multi-unit building (e.g., based on the building location information and/or the unit identifier), as described above.

In some implementations, obtaining the service coverage mapping comprises performing a lookup operation of a service coverage data structure, where the service coverage data structure maps a plurality of service coverage mappings to a plurality of sets of building location information for a plurality of multi-unit buildings, and selecting, based on the building location information, the service coverage mapping from the plurality of service coverage mappings. Additionally, or alternatively, obtaining the service coverage mapping includes determining, based on the service request, a floor of the unit and obtaining the service coverage mapping based on the building location information and the floor.

In some implementations, prior to obtaining the service coverage mapping, process 500 includes requesting the user device to provide a verification that the unit has direct access to an exterior of the multi-unit building, wherein the service coverage mapping is obtained based on receiving the verification, and wherein the indication of the location of the unit corresponds to an indication of a location of the direct access to the exterior of the multi-unit building.

In some implementations, process 500 further includes determining, based on the unit identifier, a floor of the multi-unit building that includes the unit, and obtaining the service coverage mapping includes selecting, based on the floor, the service coverage mapping from a service coverage data structure that includes a plurality of service coverage mappings associated with the multi-unit building.

As further shown in FIG. 5, process 500 may include providing a unit location request for an indication of a location of the unit within the multi-unit building (block 530). For example, the device may provide (e.g., to the user device) a unit location request for an indication of a location of the unit within the multi-unit building, as described above. In some implementations, the unit location request is provided via a user interface that is associated with a geographic information system (e.g., the user interface includes a graphical interface that is associated with the geographical information system), and the unit location request identifies, via the user interface, the multi-unit building based on the building location information.

In some implementations, the user interface comprises a graphical user interface, of the geographic information system, that is embedded within an application interface of an application, and providing the unit location request comprises obtaining, based on the geographical information system and the building location information, an image of the multi-unit building; depicting, via the graphical user interface, the image of the multi-unit building; and displaying a request for an indication identifying the unit located in the image, wherein the unit location information is received based on the graphical user interface receiving the indication.

In some implementations, prior to providing the unit location request, process 500 includes determining, based on the unit identifier, that the service coverage mapping does not indicate historical service qualification information for the unit, wherein the indication of the location of the unit is requested based on the service coverage mapping not including the historical service qualification information for the unit.

As further shown in FIG. 5, process 500 may include receiving unit location information that is associated with the indication (block 540). For example, the device may receive (e.g., in association with the unit location request) unit location information that is associated with the indication, as described above. In some implementations, the user interface comprises a graphical user interface, of the geographical information system, that is embedded within an application interface of an application, and receiving the unit location information comprises receiving a selected pixel location of an image that is depicted by the graphical user interface, and converting, using the geographical information system, the selected pixel location to geographical coordinates of the unit.

In some implementations, receiving the unit location information includes receiving, based on providing a request for an indication of a location of the unit, a selected pixel location of a graphical user interface of a geographical information system; and converting, using the geographical information system, the selected pixel location to geographical coordinates of the unit, wherein the geographical coordinates of the unit correspond to the unit location of the unit location information.

As further shown in FIG. 5, process 500 may include determining a service qualification metric (block 550). For example, the device may determine a service qualification metric based on the service coverage mapping, the unit location information, and/or the geographical coordinates of the unit, as described above. In some implementations, the service qualification metric is associated with a capability of receiving the service within the unit, associated with qualifying the unit to enable use of the service, and/or the like.

In some implementations, determining the service qualification metric comprises identifying, from the service coverage mapping, perimeter coordinates of the multi-unit building, wherein the perimeter coordinates comprise sets of geographical coordinates of a perimeter of the multi-unit building; determining, based on the perimeter coordinates and/or the unit location information, a perimeter location that is nearest the unit; determining a service coverage metric at the perimeter location; and determining the service qualification metric based on the service coverage metric. The perimeter location may be associated with network coverage of a network associated with the service.

In some implementations, determining the service qualification metric includes identifying, from the service coverage mapping and based on the geographical coordinates, a nearest qualified location that is on a perimeter of the multi-unit building, wherein the nearest qualified location corresponds to a location on the perimeter that has been qualified in association with the service; and determining the service qualification metric based on a distance between the geographical coordinates of the unit and geographical coordinates of the nearest qualified location.

In some implementations, the perimeter location is a first perimeter location and the service coverage metric is a first service coverage metric, and determining the service qualification metric includes determining that the service is not available at the perimeter location; determining, based on the service not being available, a second service coverage metric of a second perimeter location, wherein the second perimeter location is within a threshold distance of the first perimeter location, and determining the service qualification metric based on the first service coverage metric and the second service coverage metric.

As further shown in FIG. 5, process 500 may include performing an action associated with the service qualification metric (block 560). For example, the device may perform an action associated with the service qualification metric, as described above. In some implementations, performing the action comprises qualifying the unit for the service based on the service qualification metric satisfying a threshold for providing the service, and providing, to the user device, a notification that the unit is qualified for the service.

In some implementations, performing the action comprises qualifying the unit for the service based on the service qualification metric satisfying a threshold for providing the service, and updating a service coverage model associated with the service coverage mapping to include the unit location information and a unit identifier of the unit, where the service coverage model is trained to identify unit locations within multi-unit buildings based on historical data associated with identifying other units within other multi-unit buildings.

In some implementations, process 500 further includes determining that the service qualification metric does not satisfy a threshold for providing the service to the unit, wherein performing the action, based on the service metric not satisfying the threshold, includes indicating, to the user device, that the unit is not qualified for the service, causing a modification to a network that is configured to provide the service, or updating a service coverage model that is associated with the service coverage mapping to include the unit identifier in association with the geographical coordinates of the unit.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, information identifying a location selection in an image;
   converting, by the device, the location selection to unit location information;
   determining, by the device, a service qualification metric based on a service coverage mapping and the unit location information, wherein the service qualification metric indicates whether a unit associated with the unit location information is associated with one or more perimeter coordinates of a multi-unit building where a network coverage metric satisfies a threshold; and
   performing, by the device, one or more actions associated with the service qualification metric.

2. The method of claim 1, wherein the image depicts a multi-unit building in a graphical user interface.

3. The method of claim 1, wherein the location selection is based on placement of a unit location pin in a particular position of the image.

4. The method of claim 1, further comprising:
   obtaining a verification response that indicates whether a unit associated with the unit location information includes direct access to an exterior of a building; and
   wherein performing the one or more actions comprises performing the one or more actions based on the verification response.

5. The method of claim 1, wherein converting the location selection comprises:
   converting, using a geographical information system, a pixel location associated with the location selection to geographical coordinates.

6. The method of claim 1, wherein determining the service qualification metric comprises:
   identifying, from the service coverage mapping, perimeter coordinates of a multi-unit building, and
   determining whether a unit associated with the unit location information is within a threshold distance of a perimeter location associated with the perimeter coordinates.

7. A non-transitory computer-readable medium storing a set of instructions, the set of instructions comprising:
   one or more instructions that, when executed by one or more processors of a device, cause the device to:
      receive information identifying a location selection in an image;
      convert the location selection to unit location information;
      determine a service qualification metric based on a service coverage mapping and the unit location information, wherein the service qualification metric indicates whether a unit associated with the unit location information is associated with one or more perimeter coordinates of a multi-unit building where a network coverage metric satisfies a threshold; and
      perform one or more actions associated with the service qualification metric.

8. The non-transitory computer-readable medium of claim 7, wherein the one or more instructions, that cause the one or more processors to perform the one or more actions, cause the device to:
   update a service coverage model associated with the service coverage mapping,
   cause a modification to a network, or
   provide a notification that indicates whether a unit associated with the unit location information is qualified.

9. The non-transitory computer-readable medium of claim 7, wherein the one or more instructions further cause the device to:
   determine, based on the service qualification metric, whether a unit associated with the unit location information is capable of receiving a service.

10. The non-transitory computer-readable medium of claim 7, wherein the one or more instructions further cause the device to:
    obtain, using a geographical information system and based on information included in a service request, the image,
       wherein the image includes information depicting a multi-unit building; and cause the image to be depicted via a graphical user interface.

11. The non-transitory computer-readable medium of claim 7, wherein the one or more instructions further cause the device to:
    cause a request to be displayed via a graphical user interface to position a unit location pin in the image to indicate where a unit is located in a multi-unit building.

12. The non-transitory computer-readable medium of claim 7, where in the service qualification metric indicates a capability of receiving a service.

13. The non-transitory computer-readable medium of claim 7, wherein the service qualification metric is associated with receiving a service via an ultrawide band wireless network.

14. A device, comprising:
one or more processors configured to:
receive information identifying a location selection in an image;
convert the location selection to unit location information;
determine a service qualification metric based on a service coverage mapping and the unit location information, wherein the service qualification metric indicates whether a unit associated with the unit location information is associated with one or more perimeter coordinates of a multi-unit building where a network coverage metric satisfies a threshold; and
perform one or more actions associated with the service qualification metric.

15. The device of claim 14, wherein the one or more processors are further configured to:
perform a lookup operation of a service coverage data structure; and
select the service coverage mapping from a plurality of service coverage mappings.

16. The device of claim 14, wherein the location selection is based selecting a pixel location of the image.

17. The device of claim 14, wherein the one or more processors are further configured to:
generate the unit location information,
wherein the unit location information identifies a selected pixel location of the image.

18. The device of claim 14, wherein the one or more processors are further configured to:
obtain a verification response that indicates whether a unit associated with the unit location information includes direct access to an exterior of a building; and
determine whether a unit associated with the unit location information is capable of receiving a service based on the verification response.

19. The device of claim 14, wherein the one or more processors, to determine the service qualification metric, are configured to:
identify, from the service coverage mapping, perimeter coordinates of a multi-unit building;
determine a service coverage metric associated with the perimeter coordinates; and
determine the service qualification metric based on the service coverage metric.

* * * * *